(12) United States Patent
Grant et al.

(10) Patent No.: US 9,635,417 B2
(45) Date of Patent: Apr. 25, 2017

(54) ACQUISITION, RECOVERY, AND MATCHING OF UNIQUE INFORMATION FROM FILE-BASED MEDIA FOR AUTOMATED FILE DETECTION

(71) Applicant: DOLBY LABORATORIES LICENSING CORPORATION, San Francisco, CA (US)

(72) Inventors: Michael Grant, San Francisco, CA (US); Regunathan Radhakrishnan, Foster City, CA (US); Jeff Edwin Chandler, Pacifica, CA (US); Stewart Murrie, San Francisco, CA (US); Michael G. Babbitt, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/781,549

(22) PCT Filed: Mar. 13, 2014

(86) PCT No.: PCT/US2014/025979
§ 371 (c)(1),
(2) Date: Sep. 30, 2015

(87) PCT Pub. No.: WO2014/165304
PCT Pub. Date: Oct. 9, 2014

(65) Prior Publication Data
US 2016/0066032 A1 Mar. 3, 2016

Related U.S. Application Data

(60) Provisional application No. 61/809,001, filed on Apr. 5, 2013.

(51) Int. Cl.
*H04N 21/44* (2011.01)
*G06F 17/30* (2006.01)
(Continued)

(52) U.S. Cl.
CPC . *H04N 21/44008* (2013.01); *G06F 17/30017* (2013.01); *G06F 17/30784* (2013.01);
(Continued)

(58) Field of Classification Search
USPC ........ 725/116, 13, 14, 22, 36; 382/315, 119, 382/124; 375/240.26
See application file for complete search history.

(56) References Cited

U.S. PATENT DOCUMENTS 7,672,337 B2 * 3/2010 Steelberg ............. H04H 20/106
370/486
8,130,928 B2 3/2012 Bookstaff
(Continued)

FOREIGN PATENT DOCUMENTS

| GB | 2485694 | 5/2012 |
| WO | 2004/080073 | 9/2004 |
| WO | 2009/150425 | 12/2009 |

OTHER PUBLICATIONS

New US Broadcast Verification Service from Idioma Eases Pre-Encoding http://www.idiomasolutions.com/page.asp?ID=21.
(Continued)

*Primary Examiner* — Hoang-Vu A Nguyen-Ba
(74) *Attorney, Agent, or Firm* — Zhichong Gu; Wong & Rees LLP

(57) ABSTRACT

A media fingerprint archive system generates and archives media fingerprints from second media content portions such as commercials. A downstream media measurement system can extract/derive query fingerprints from an incoming signal, and query the media fingerprint archive system (Continued)

whether any of the query fingerprints matches any archived fingerprints. If so, the media measurement system can perform media measurements on a specific secondary media content portion from which the matched query fingerprint is derived. If not, the media measurement system can analyze media characteristics of a media content portion to determine whether the media content portion is a secondary media content portion and perform media measurement if needed to. The media measurement system may send fingerprints from an identified secondary media content portion to the media fingerprint archive system for storage.

16 Claims, 6 Drawing Sheets

(51) Int. Cl.
H04N 21/81 (2011.01)
H04N 21/442 (2011.01)
H04N 21/234 (2011.01)

(52) U.S. Cl.
CPC . *G06F 17/30867* (2013.01); *H04N 21/23418* (2013.01); *H04N 21/442* (2013.01); *H04N 21/812* (2013.01)

(56) References Cited

U.S. PATENT DOCUMENTS

| | | | |
|---|---|---|---|
| 8,682,145 B2* | 3/2014 | Poniatowki | H04N 21/278 386/248 |
| 8,947,595 B1* | 2/2015 | Tucker | H04N 21/231 348/445 |
| 9,106,804 B2* | 8/2015 | Roberts | G11B 27/031 |
| 2012/0136701 A1 | 5/2012 | Relan | |
| 2014/0082651 A1* | 3/2014 | Sharifi | H04N 21/23418 725/20 |

OTHER PUBLICATIONS

Ogle, J.P. et al "Fingerprinting to Identify Repeated Sound Events in Long-Duration Personal Audio Recordings" IEEE International Conference on Acoustics, Speech, and Signal processing, Apr. 15-20, 2007, pp. I-233.

Herre, J. et al "Robust Matching of Audio Signals Using Spectral Flatness Features" IEEE Applications of Signal Processing to Audio and Acoustics, Oct. 21-24, 2001, pp. 127-130.

Law-To, Julien et al "Video Copy Detection: A Comparative Study" ACM, Jul. 9, 2007, pp. 371-378.

Haitsma, J. et al "A Highly Robust Audio Fingerprinting System" IRCAM 2002.

Lee, S. et al "A TV Commercial Monitoring System Using Audio Fingerprinting" Sep. 15, 2007, ICEC Springer Berlin, Heidelberg, Berlin, pp. 454-457.

* cited by examiner

```
┌─────────────────────────────────────────┐
│  extract query fingerprints from media data that │
│    comprises primary media content portions      │
│    and secondary media content portions  402     │
└─────────────────────────────────────────┘
                    │
┌─────────────────────────────────────────┐
│     send a plurality of fingerprint identification│
│  queries to a media fingerprint archive system 404│
└─────────────────────────────────────────┘
                    │
┌─────────────────────────────────────────┐
│    receive a plurality of fingerprint identification│
│     responses from the media fingerprint archive │
│                   system 406                     │
└─────────────────────────────────────────┘
                    │
┌─────────────────────────────────────────┐
│    in response to receiving at least one positive│
│   fingerprint identification response, identify a first│
│  secondary media content portion to perform media│
│               measurements 408                   │
└─────────────────────────────────────────┘
```

FIG. 4A

```
┌─────────────────────────────────────────┐
│ maintain a media fingerprint archive for secondary │
│         media content portions  452      │
└─────────────────────────────────────────┘
                    │
┌─────────────────────────────────────────┐
│  receive, from a client, a fingerprint identification │
│  query with a query fingerprint derived from media │
│                data  454                 │
└─────────────────────────────────────────┘
                    │
┌─────────────────────────────────────────┐
│    in response to receiving the fingerprint │
│  identification query, determine whether the query │
│      fingerprint matches with any archived │
│              fingerprint  456            │
└─────────────────────────────────────────┘
                    │
┌─────────────────────────────────────────┐
│    in response to determining that the query │
│  fingerprint matches with an archived fingerprint, │
│     return a positive fingerprint identification │
│               response  458              │
└─────────────────────────────────────────┘
```

FIG. 4B

ACQUISITION, RECOVERY, AND MATCHING OF UNIQUE INFORMATION FROM FILE-BASED MEDIA FOR AUTOMATED FILE DETECTION

CROSS REFERENCE TO RELATED APPLICATIONS

This application claims priority to U.S. Provisional Patent Application No. 61/809,001, filed on 5 Apr. 2013, which is hereby incorporated by reference in its entirety.

TECHNOLOGY

The present invention relates generally to media processing systems, and in particular, to acquisition, recovery, and matching of unique information from file-based media for automated file detection.

BACKGROUND

Broadcast networks and operators depend on commercials for revenue. However, commercials are produced and provided by many different entities and individuals. A commercial embedding within non-commercial normal program materials may have objectionable characteristics such as unreasonable loudness to many viewers/listeners. Given potentially a very large audience for its programs, a broadcast network or operator may receive a large number of complaints to commercials with objectionable characteristics that are in the programs.

To address these complaints as required by law and to comply with relevant viewer protection regulations, a broadcast network or operator may need to deploy significant human resources in monitoring its broadcast channels or media data bitstreams which the broadcast network or operator receives or sends/broadcasts. The information gathered through monitoring may be used to determine whether these channels or bitstreams contain commercials with objectionable characteristics in response to complaints or audits. It is questionable whether the problems with these commercials can be effectively identified, even when the broadcast network or operator spends a large amount of resources on monitoring its programs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1:
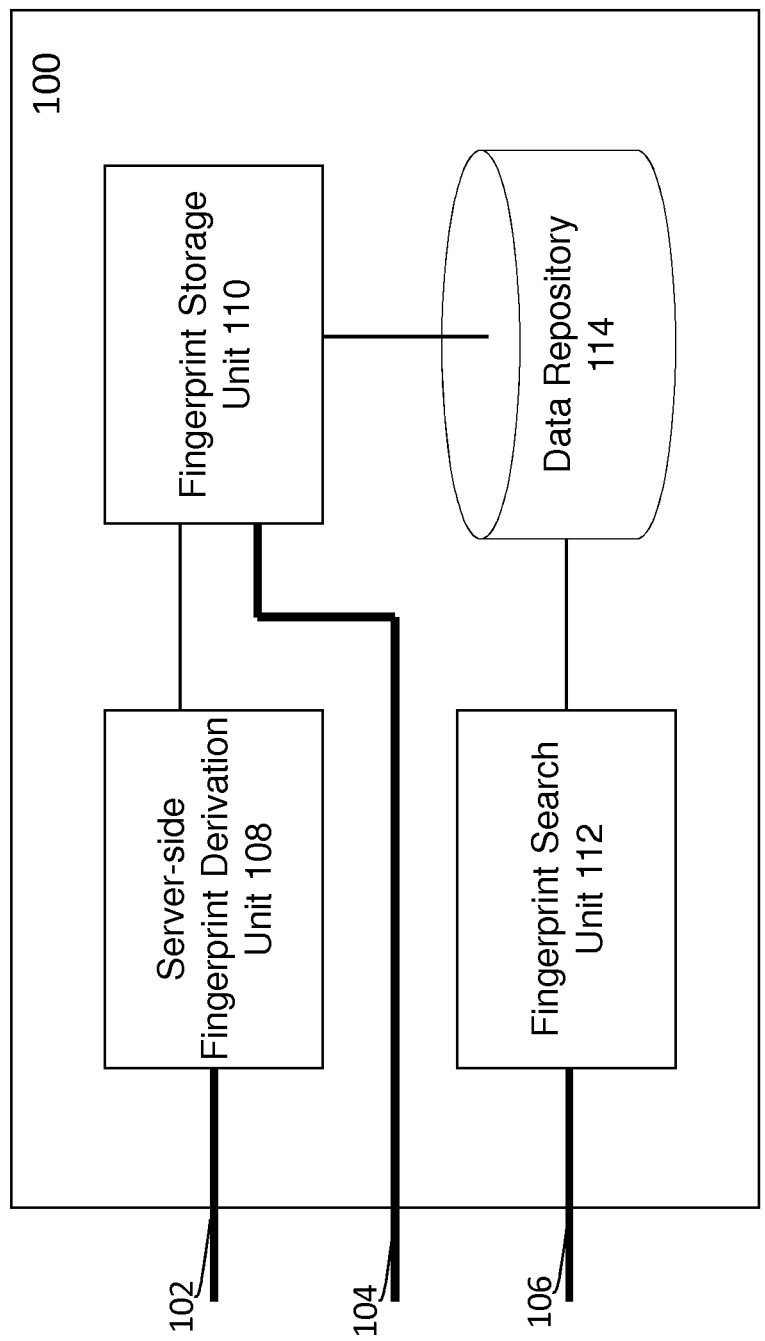
FIG. 1 shows a media fingerprint archive system.

Example embodiments, which relate to acquisition, recovery, and matching of unique information from file-based media for automated file detection, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA DATA AND MEDIA CONTENT PORTIONS
3. MEDIA FINGPRINT ARCHIVE SYSTEM
4. MEDIA MEASUREMENT SYSTEM
5. ALGORITHM TO DETECT SECONDARY CONTENT PORTIONS
6. EXAMPLE PROCESS FLOW
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

In some embodiments, a media fingerprint archive system with a fingerprint engine or a server-side fingerprint derivation unit—as operated by a commercial aggregator, a media network, a broadcast company, a large network operator, etc.—processes secondary media content portions to be embedded with primary media content portions in media data in downstream media systems; generates media fingerprints from media data units of the second media content portions; and stores the media fingerprint in a fingerprint archive.

As used herein, a fingerprint archive may be an online, cloud-based database, a proprietary database, etc. A "media data unit" may comprise media sample data for a time unit. Examples of media data units may be a plurality of contiguous media samples or frames for a time unit of 32 milliseconds, 64 milliseconds, etc. "Secondary media content portions" may be commercial advertisements, promotional advertisements, etc., in various types of media. "Primary media content portions" may be programs, shows, game broadcasts, concerts, movies, etc., in various types of media. "Media data" may comprise primary media content portions embedded with secondary media content portions, for example, in allocated advertisement time slots. Examples of media include but are not limited to: audio only, video only, audio video, media files, media bitstreams, etc. Other information including but not limited to other unique identifiers other than the media fingerprints, sequentially assigned identifiers for corresponding secondary media content portions, unique alphanumeric labels for corresponding secondary media content portions, etc., in addition to the media fingerprints can also be stored, archived and made accessible with the media fingerprints in the fingerprint archives.

The media fingerprint archive system may be configured to support one or more (downstream) media measurement systems. In some embodiments, a fingerprint engine or a client-side fingerprint derivation unit of a downstream media measurement system can extract/derive/generate media fingerprints from an incoming signal, bitstream, file, etc., in real-time, near-real-time, off-line, non-real-time, etc.

In an example embodiment, a media measurement system—as operated by a network operator or station, etc.—processes media data to be broadcasted, downloaded or otherwise distributed to viewers/listeners; generates query fingerprints from media data units of the media data; sends fingerprint identification queries to the media fingerprint archive system; and receives fingerprint identification responses from the media fingerprint archive system to determine whether any of the query fingerprints corresponds to a secondary media content portion in the media data.

In response to a positive fingerprint identification response that indicates the presence of a specific secondary media content portion, an individual set of media measurements including but not limited to loudness measurements, etc., can be performed for the specific secondary media content portion.

If a fingerprint match is not readily found between a query fingerprint and archived fingerprints, media characteristics and other identification information within the media data can be analyzed. For example, the downstream media measurement system can analyze time of day, duration, frequency of scene changes, facial recognition, figure/form recognition, presence of speech, presence of music, identification of audio transients, visual spectral content, audio spectral content, video effects, ticklers, pre-existing secondary program identifiers, network watermarks, rating watermarks, captioned/embedded texts, applause, program and scene transition, loudness, etc., in the media data. Classifiers or classification algorithms can be used to determine whether a particular media content portion or a media data unit is or is not a secondary media content portion, using weighting based on the presence or absence of such classifiers. For the purpose of the invention, it should be noted that other media characteristics other than those enumerated herein may be used by classifiers or classification algorithms to determine media content types. An analysis of a large amount of "secondary media content" (e.g., training data, labeled data, etc.) can be analyzed to determine what classifiers should be used or what weight values should be assigned to their respective classifiers for the purpose of classifying media content types. Additionally, multiple classifiers can be combined to increase their strength for correctly classifying media content types. For example, facial recognition can be combined with the presence of speech in a combined classifier to identify a voice-over (e.g., speech with no one on screen, etc.), which may be used as a factor to determine whether a particular content portion is a secondary media content portion.

In some embodiments, if a media content portion is determined to be a secondary media content portion (e.g., a commercial, etc.), then (e.g., multi-audio-channel) volume levels or loudness settings of the secondary media content portion can be determined, tagged or even adjusted to comply with legal and/or business requirements. If a media content portion is determined to be not a secondary media content portion (e.g., not a commercial, etc.), the media content portion may retain original volume levels or loudness settings, for example, as intended by movie producers, broadcasters, media artists, etc.

In some embodiments, the media fingerprint archive system and the media measurement system may be deployed at the same geographic location. In some other embodiments, the media fingerprint archive system and the media measurement system may be deployed at different geographic locations. The systems may communicate or access media fingerprint identification services over a cloud of networks. In an example embodiment, the media measurement system may be located at an operator facility, whereas the media fingerprint archive system that supports online accesses and provides online fingerprint identification services to the media measurement system may be located at a commercial aggregation facility.

As one possible non-limiting application, techniques as described herein can be used to perform spot checks on media programs, as mandated by the Commercial Advertisement Loudness Mitigation (CALM) Act. These techniques can be used to perform spot checks on a media network or operator's media programs on 100% of its channels with a large number of (e.g., 50 million, 200 million, etc.) possible commercials for any length of time.

Instead of capturing hours of programming containing a large amount of primary program materials mixed with commercial content, manually monitoring/identifying periods of the commercial content in the programming, and measuring the commercial content with significant user intervention/involvement as in other approaches, the techniques as described herein provide automatic and reliable detection, measurement and control of commercial content in a media network or operator's media programs, without any need to carry in-band data that identifies secondary media content portions. While techniques as described herein can work in the presence of the in-band data, carrying such in-band data can often add bit overhead requirements to an encoded media signal. Additionally, such in-band data might be used to easily identify commercials, thereby facilitating commercial-bypassing techniques to bypass those commercials in home viewing environments (which is bad for content providers).

Techniques as described herein can be deployed in a wide range of media systems, from that of a very large media network/operator/station to that of a head-end in a local cable network or to that of a small off-the-air broadcast station. A media measurement system as described herein can be provided as a dedicated system, or a module incorporated into a media system that has other functions other than media measurements, or a media measurement application running on one or more computing devices. Techniques can be implemented and/or released as software, hardware, firmware, or a combination of two or more of the foregoing. Third-party system providers can also be provided with toolkits (e.g., System Development Kits or SDKs, etc.) to implement techniques as described herein in their respective systems.

In some embodiments, mechanisms as described herein form a part of a media processing system, including but not limited to: aggregation system, distribution system, receiving system, broadcast network system, broadcast station system, broadcast operator system, cable broadcast system, satellite broadcast system, over-the-air broadcast system, cable distribution system, satellite distribution system, over-the-air transceiver system, cable receiving system, satellite receiving system, over-the-air receiving system, head end, desktop computer, computer workstation, various other kinds of devices and media processing modules, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Media Data and Media Content Portions

Media data as described herein comprises media sample data (e.g., video frames, audio frames or PCM audio samples containing media content, etc.) that represents media content portions. A media content portion may be described herein with reference to one or more example media, including still images, video, and/or audio media. The selection of example mediums in this description may be made for simplicity and concise unity and, unless expressly stated to the contrary, should not be construed as limiting an embodiment to a particular medium as embodiments of the present invention are well suited to function with either still images, audio media, or video media. Furthermore, embodiments of the present invention are well suited to function with images corresponding to audio and/or video media, which may represent two or three spatial dimensions.

In some embodiments, media data comprises one or more primary media content portions—represented by normal program materials (e.g., a popular TV show, a news program, a live game broadcast, not commercial advertisements, etc.)—embedded with one or more secondary media content portions represented by commercial advertisements (or simply "commercials"). The media data comprising both the primary and secondary media content portions may be broadcasted, distributed, downloaded, etc., in the form of one or more media signals, one or more media channels or media bitstreams from a media data provider system to downstream systems. The media data provider system may insert or place a secondary media content portion (e.g., a commercial, etc.) into a primary media content portion (e.g., a normal program material, etc.) within a commercial break in the primary media content portion, for example, in exchange for a payment. In some embodiments, the media data further comprises media metadata (e.g., closed caption data, etc.) separate from the media sample data (e.g., video frames, audio frames or PCM audio samples containing media content, etc.) that represents the primary and secondary media content portions. In some embodiments, the media metadata in the media data as described herein may carry information that can be analyzed along with the media sample data in the media data for the purpose of classifying media content; however, in some embodiments, the media metadata does not comprise content type flags, bits, attributes, etc., that positively identify any embedded secondary media content portions. Accordingly, a recipient device cannot use such content type flags, bits, attributes, etc., to skip or replace secondary media content portions in broadcast operations, playback operations or distribution operations.

Examples of media data provider systems that provide or distribute media data as described herein and downstream systems that receive the media data include, but are not limited only to any of: broadcast network systems, broadcast station systems, broadcast operator systems, cable broadcast systems, satellite broadcast systems, over-the-air broadcast systems, cable distribution systems, satellite distribution systems, over-the-air transceiver systems, cable receiving systems, satellite receiving systems, over-the-air receiving systems, head ends, etc.

3. Media Fingerprint Archive System

FIG. 1 shows a media fingerprint archive system (100) in accordance with one or more embodiments. As shown in FIG. 1, the system (100) includes a Server-side Fingerprint Derivation Unit (108), a Fingerprint Storage Unit (110), a Fingerprint Search Unit (112), and a Data Repository (114), which is a media fingerprint archive for secondary media content portions to be embedded with primary media content portions in media data.

Each of these components is described below and may be located on the same device (e.g., a server, mainframe, a set-top box, a computer, a client system, etc.) or may be located on separate devices coupled by a network (e.g., Internet, Intranet, Extranet, Local Area Network (LAN), Wide Area Network (WAN), etc.), with wired and/or wireless segments. In one or more embodiments, the system 100 is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces, web portals, or any other tool to access the system 100. In one or more embodiments, the system (100) is accessible over a network connection, such as the Internet. Information and/or services provided by the system (100) may also be stored and accessed over the network connection.

In an embodiment, the Server-side Fingerprint Derivation Unit 108 corresponds to software and/or hardware configured to receive secondary media content portions 102 and derive (e.g., extract, generate, determine, compute, etc.) one or more media fingerprints ("fingerprint" used herein interchangeably with "signature") from secondary media content portions that are to embed within one or more primary media content portions in media data.

A media fingerprint may correspond to a fingerprint already archived in the Data Repository (114), or a fingerprint to be stored in the Data Repository (114), a query fingerprint that is to be searched for in the Data Repository (114), etc. Examples of media fingerprints include but are not limited to: video fingerprints, audio fingerprints, etc. Video fingerprints may be derived from images or frames of a video clip (which is a media content portion). In some embodiments, a video fingerprint comprises a low bit rate representation of video content from which it is derived and uniquely corresponds to the video content and can be computed from characteristic components of the video content to which the video fingerprint corresponds; the characteristic components comprise one or more of luminance, chrominance, or motion descriptors of the video content. Audio fingerprints may be derived from audio data or from images with embedded audio information (e.g., spectrograms, etc.) in a media content portion. In some embodiments, an audio fingerprint can be generated from a particular audio waveform as code that uniquely corresponds to the particular audio waveform. A media fingerprint is not a logically assigned unique identifier such as a sequence number but rather is content-dependent and derived based on specific media content in a media data unit. In some embodiments, the same media fingerprint of a media data unit present in different streams of media data may be independently obtained from the media content of the media data unit by different systems based on the same fingerprint derivation algorithm. In some embodiments, the substantially same media fingerprints (e.g., where a small bit portion of the media fingerprints are different, where a large number of the most significant bits matches, where only a few of the least significant bits do not match, etc.) of a media data unit present in different streams of media data may be independently obtained from the media content of the media data unit by different systems based on the same fingerprint derivation algorithm.

The Server-side Fingerprint Derivation Unit 108 may be configured to derive multiple fingerprints from a single secondary media content portion (e.g., by using fingerprint derivation techniques with varying levels of robustness or sensitivity to changes) in the secondary media content portions (102). Furthermore, the Server-side Fingerprint Derivation Unit 108 may also be configured to separately derive fingerprints for different components of a secondary media content portion in the secondary media content portions (102). For example, audio/video data in secondary media content portions may be separated into separate components (e.g., audio components and video components, etc.) using a demultiplexer and fingerprints may be derived separately for each component of the secondary media content portion.

In an embodiment, the Fingerprint Storage Unit (110) corresponds to software and/or hardware configured to receive media fingerprints derived from secondary media content portions from one or more fingerprint sources and store the media fingerprints in the Data Repository (114). In an example, the Fingerprint Storage Unit (110) can receive media fingerprints derived from secondary media content portions (102) from the Server-side Fingerprint Derivation Unit (108). In another example, the Fingerprint Storage Unit (110) can receive media fingerprints derived from secondary media content portions from a different fingerprint source other than the Server-side Fingerprint Derivation Unit (108). In some embodiments, a client (e.g., 200 of FIG. 2, etc.) of the system (100) can detect secondary media content portions whose fingerprints have not been previously archived in the Data Repository (114). The client can provide a detected secondary media content portion to the system (100), or the Server-side Fingerprint Derivation Unit (108) therein; or alternatively derive media fingerprints (104) for the detected secondary media content portion and submit the derived media fingerprints (104) to the system (100), or the fingerprint storage (110), for archiving in the Data Repository (114). A multitude of other implementations (e.g., data structures, relational tables, lookup tables, hash tables, etc.) may be used for organizing and/or storing the fingerprint in the Data Repository (114).

In an embodiment, the Fingerprint Search Unit (112) corresponds to software and/or hardware configured to receive one or more query fingerprints (106) in one or more fingerprint identification queries from a client of the system (100) and search for an archived fingerprint that is derived from a secondary media content portion and archived in the Data Repository (114) based on the query fingerprint (106). For example, archived fingerprints in the Data Repository (114) may be looked up and/or compared to each of the query fingerprints (106) by the Fingerprint Search Unit (112) to identify whether a query fingerprint matches an archived fingerprint. In response to identifying that a query fingerprint matches an archived fingerprint (e.g., finding an exact match, finding an approximate match where a small portion of the query fingerprint and the archived fingerprint being matched are different, finding an approximate match where a large number of the most significant bits matches, finding an approximate match where only a few of the least significant bits do not match, etc.), a positive fingerprint identification response for the query fingerprint may be sent by the Fingerprint Search Unit (112) to the client that sends a fingerprint identification query with the query fingerprint. In response to identifying that a query fingerprint does not match any archived fingerprint (e.g., no exact match, finding no approximate match where a small portion of the query fingerprint and an archived fingerprint being matched are different, finding no approximate match where a large number of the most significant bits matches, finding no approximate match where only a few of the least significant bits does not match, etc.), a negative fingerprint identification response for the query fingerprint may be sent by the Fingerprint Search Unit (112) to the client that sends a fingerprint identification query with the query fingerprint. In some embodiments, a fingerprint identification query may include additional query information other than a query fingerprint including but not limited to identification information for media data from which the query fingerprint is derived, etc. In some embodiments, a fingerprint identification response may include additional response information other than an indication whether the response is positive or negative including but not limited to identification information for a secondary media content portion from which the matched archived fingerprint was derived.

In one or more embodiments of the invention, the Data Repository (114) corresponds to any data storage device (e.g., local memory on a client machine, multiple servers connected over the internet, systems within a local area network, a memory on a mobile device, etc.) or database in which media content fingerprints derived from secondary media content portions may be stored and/or queried for based on query fingerprints received from clients of the media fingerprint archive system (100). In one or more embodiments of the invention, access to the Data Repository (114) may be restricted and/or secured. As such, access to the Data Repository (114) may require authentication using passwords, secret questions, personal identification numbers (PINs), biometrics, and/or any other suitable authentication mechanism. Elements or various portions of data stored in the Data Repository (114) may be distributed and stored in multiple data repositories (e.g., servers across the world, etc.). In one or more embodiments of the invention, the Data Repository (114) includes flat, hierarchical, network based, relational, dimensional, object modeled, or data files structured otherwise. For example, Data Repository (114) may be maintained as a table of a SQL database. In addition, data in the Data Repository (114) may be verified against data stored in other repositories.

4. Media Measurement System

Figure 2:
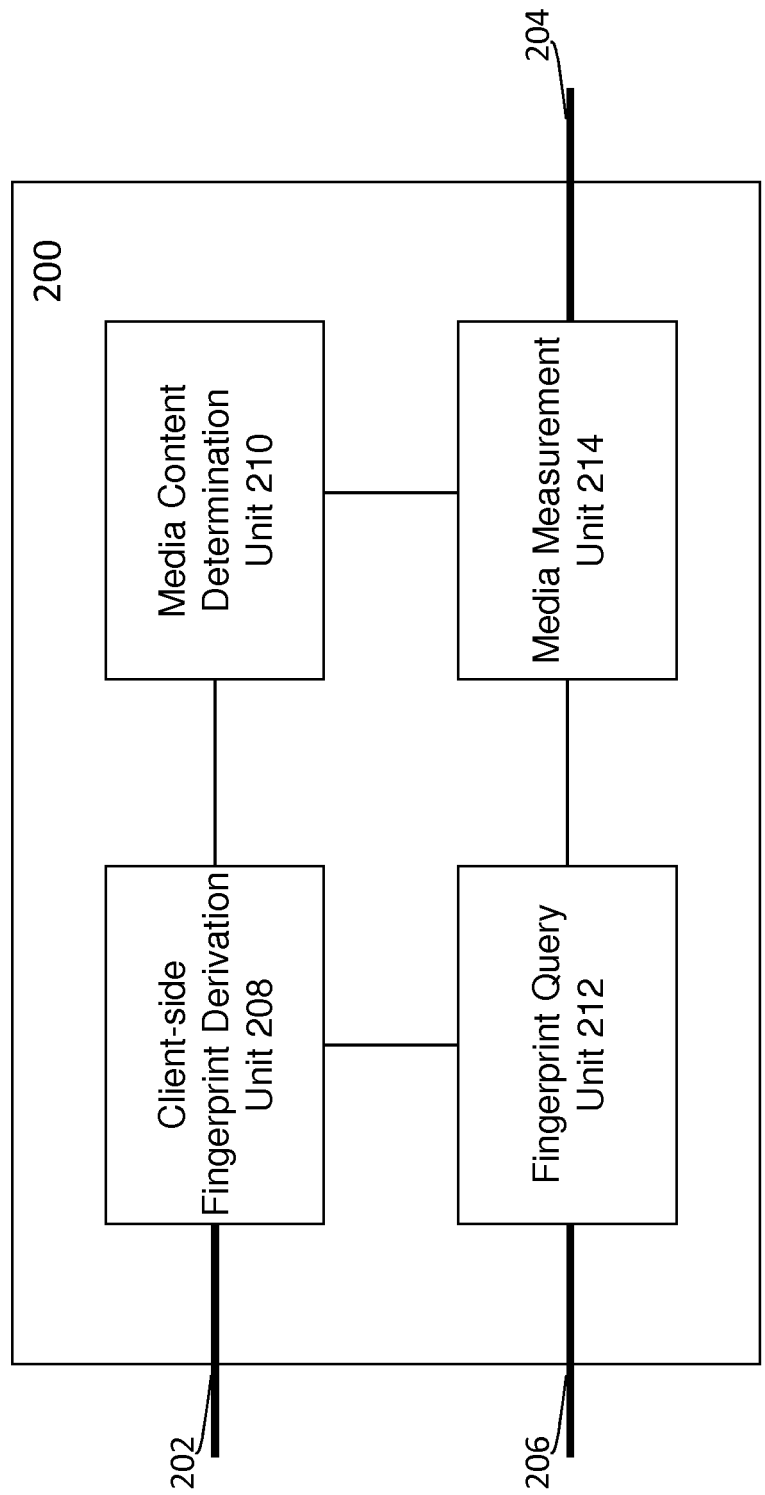
FIG. 2 shows a media measurement system.

FIG. 2 shows a media measurement system (200) in accordance with one or more embodiments. As shown in FIG. 1, the system (200) includes a Client-side Fingerprint Derivation Unit (208), a Media Content Determination Unit (210), a Fingerprint Query Unit (212), and a Media Measurement Unit (214).

Each of these components is described below and may be located on the same device (e.g., a server, mainframe, a set-top box, a computer, a client system, etc.) or may be located on separate devices coupled by a network (e.g., Internet, Intranet, Extranet, LAN, WAN, etc.), with wired and/or wireless segments. In one or more embodiments, the system 200 is implemented using a client-server topology. The system (200) itself may be an enterprise application running on one or more servers, and in some embodiments could be a peer-to-peer system, or resident upon a single computing system. In addition, the system (200) is accessible from other machines using one or more interfaces, web portals, or any other tool to access the system 200. In one or more embodiments, the system (200) is accessible over a network connection, such as the Internet. Information and/or services provided by the system (200) may also be stored and accessed over the network connection.

In an embodiment, the Client-side Fingerprint Derivation Unit 208 corresponds to software and/or hardware configured to receive media data 202 and derive (e.g., extract, generate, determine, compute, etc.) one or more media query fingerprints (or simply "query fingerprints") from the media data (202) that comprises primary media content portions embedded with secondary media content portions.

A query fingerprint as generated by the Client-side Fingerprint Derivation Unit (208) can be sent to a media fingerprint archive system (e.g., 100 of FIG. 1) and searched for in the database (114). A query fingerprint may be derived from a secondary media content portion or a primary media content portion. The Client-side Fingerprint Derivation Unit 108 may be configured to derive multiple fingerprints from a single media content portion (e.g., by using fingerprint derivation techniques with varying levels of robustness or sensitivity to changes) in the media data (202). Furthermore, the Client-side Fingerprint Derivation Unit 208 may also be configured to separately derive fingerprints for different components of a media content portion in the media data (202). For example, audio/video data in the media data (202) may be separated into separate components (e.g., audio components and video components) using a demultiplexer and query fingerprints may be derived separately for each component of the media data (202).

In an embodiment, the Fingerprint Query Unit (212) corresponds to software and/or hardware configured to send one or more fingerprint identification queries (206) with one or more query fingerprints (e.g., 106 of FIG. 1, etc.) to a media fingerprint archive system (e.g., 100 of FIG. 1, etc.) and receive one or more fingerprint identification responses from the media fingerprint archive system (100) to the one or more fingerprint identification queries (206).

In an embodiment, the Fingerprint Content Determination Unit (210) corresponds to software and/or hardware configured to analyze a media data unit in the media data (202) to identify media characteristics of the media data unit, and to determine whether the media data unit corresponds to a secondary media content portion embedded within the media data (202) based on the identified media characteristics of the media data unit. In some embodiments, the Fingerprint Content Determination Unit (210) is configured to determine whether a media data unit corresponds to a secondary media content portion embedded within the media data (202) in response to the Fingerprint Query Unit (212) receiving a negative fingerprint identification response with respect to a query fingerprint extracted or derived from the media data unit. In some embodiments, the Fingerprint Content Determination Unit (210) is configured to determine whether a media data unit corresponds to a secondary media content portion embedded within the media data (202), regardless of whether the Fingerprint Query Unit (212) receives a negative fingerprint identification response with respect to a query fingerprint extracted or derived from the media data unit. In some embodiments, the media fingerprint measurement system (200) is configured to use one or both of the Fingerprint Query Unit (212) and the Fingerprint Content Determination Unit (210) to determine whether a media data unit corresponds to a secondary media content portion embedded within the media data (202).

Media characteristics generally represent any characteristics of media content that may be detected using any audio/video analysis methods. Media characteristics may include visually perceptible characteristics within the media content that may be detected. Examples of such visually perceptible characteristics that may identify media content include: network watermarks, rating watermarks, captioned/embedded texts, applause, program and scene transition, loudness, etc. Media characteristics may also include other characteristics of the media content that may be detected, such as geographic location, time of day, etc.

In some embodiments, the Media Content Determination Unit (210) further comprises one or more classifiers and/or one or more classification algorithms configured to classify a media data unit extracted/decoded from the media data (202) based on media characteristics identified in the media data unit. In an embodiment, a classifier or classification algorithm assigns individual weight factors to different media characteristics. A weight factor for a media characteristic may scale with a likelihood of the media data unit being a part of a secondary media content portion given the presence of the media characteristic. In an embodiment, the Media Content Determination Unit (210) uses multiple classifiers or multiple classification algorithms. The Media Content Determination Unit (210) may assign individual weight factors to individual classifiers or classification algorithms.

In some embodiments, media characteristics identified from a training set of media data units may form a set of vectors to determine whether a classifier has a high error rate or a low error rate in predicting correct content types of media data units and to assign weight factors accordingly. In some embodiments, a strong classifier may be created based on the set of vectors obtained from the training set using an "Adaboost" algorithm. The strong classifier may thereafter be applied to each media data unit of the media data (202), for the purpose of determining whether the media data unit corresponds to a secondary media content portion or a primary media content portion, and/or for the purpose of determining whether the media data unit corresponds to a new secondary media content portion or an existing secondary media content portion. In an embodiment, as a part of or in addition to classifiers or classification algorithms, the Media Content Determination Unit (210) also uses algorithms to detect scene changes in the media data (202) based on the (time-dependent) identified media characteristics.

In some embodiments, the Media Content Determination Unit (210) further comprises one or more classifiers and/or one or more classification algorithms configured to provide a detected secondary media content portion to a media fingerprint archive system (e.g., 100 of FIG. 1, etc.); or alternatively derive media fingerprints for the detected secondary media content portion and submit the derived media fingerprints (e.g., 104 of FIG. 1, etc.) to a media fingerprint archive system (e.g., 100 of FIG. 1, etc.) for archiving in a fingerprint archive (e.g., the Data Repository 114 of FIG. 1, etc.). Additional information of the secondary media content portion including characteristics such as loudness, etc., may be provided to the media fingerprint archive system.

In an example, the Media Measurement Unit (214) corresponds to software and/or hardware configured to perform one or more measurements over a secondary media content portion in the media data (202). In some embodiments, the Media Measurement Unit (214) is further configured to output the measurements performed over the secondary media content portion in the media data (202) so that data for the measurements or media measurement data (204) can be stored, for example, persistently in a media measurement data repository (not shown). The data for measurements performed over a secondary media content portion (or simply "media measurement data") includes but is not limited to, any of: one or more of loudness, length, an identifier of the secondary media content portion, time of day, channel, network address, etc. In some embodiments, the media measurement data may be stored at a media measurement data repository collocated with the media measurement system (210). In some embodiments, the media measurement data may be stored at a media measurement data repository remote to the media measurement system (210). In some embodiments, the media measurement data may be stored at a media measurement data repository collocated with a media fingerprint archive system (e.g., 100 of FIG. 1, etc.). One or more keys can be generated and/or stored along with the media measurement data to allow fast read and/or write access to the media measurement data based on given values of the one or more keys.

5. Algorithm to Detect Secondary Content Portions

Figure 3:
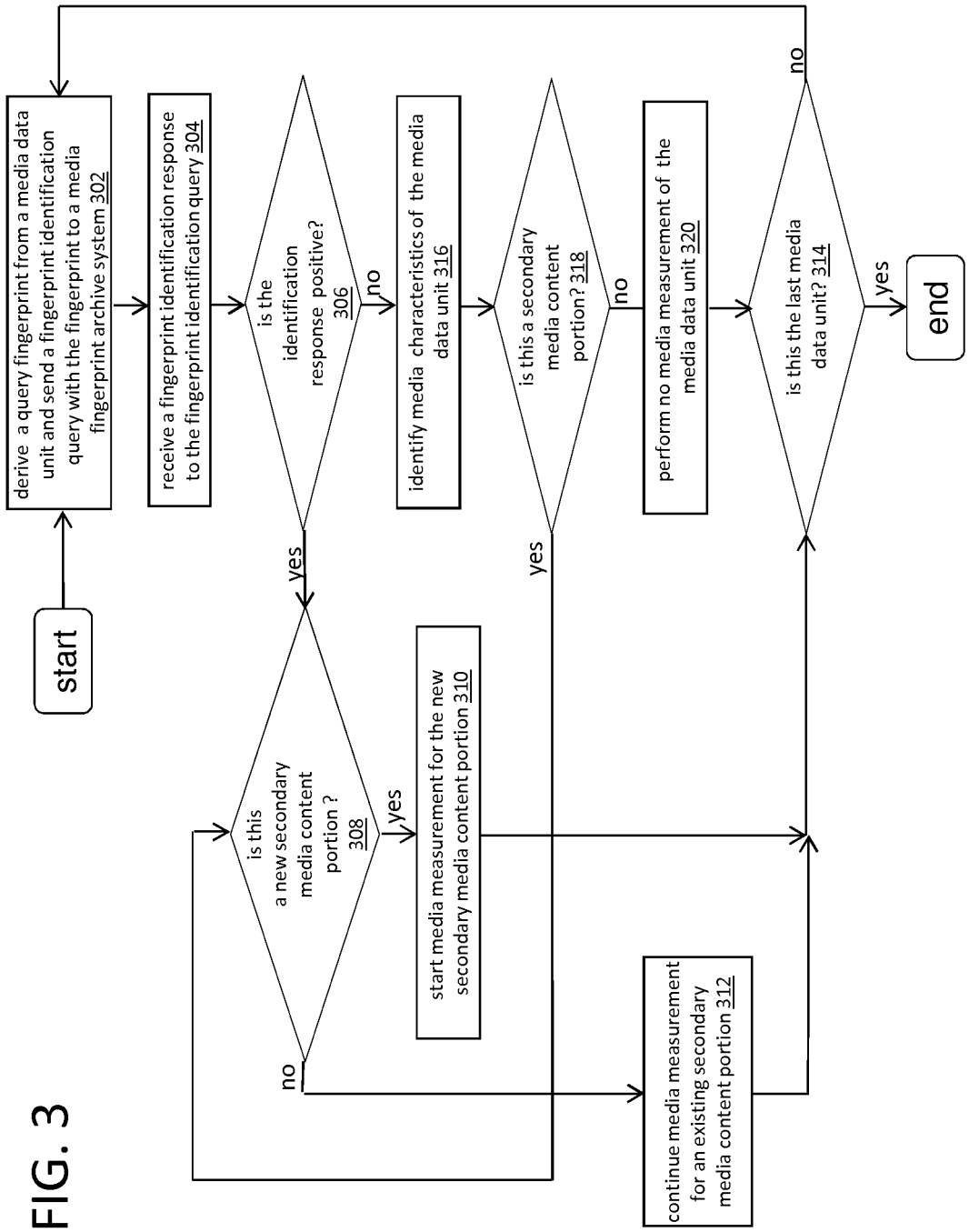
FIG. 3 illustrates an example algorithm or process flow to search for and perform measurements on secondary media content portions in media data.

FIG. 3 illustrates an example algorithm or process flow to search for and perform measurements on secondary media content portions in media data. In some example embodiments, one or more computing devices or components may perform this process flow.

A media measurement system (e.g., 200 of FIG. 2, etc.) performing the example algorithm may receive and/or process media data (e.g., 202 of FIG. 2, etc.) either in real time, in non-real time, or part in real time and part in non-real time. In some embodiments, the media measurement system (200) is configured to logically divide the media data (202) into a sequence of media data units. In some embodiments in which the media data (202) is received in a real time broadcast, the media measurement system (200) is configured to process the media data units in the same order as the order in which these media data units are received in the media data (202). In some embodiments in which the media data (202) is received in a non-real time media signal, a media data bitstream, a media file, through a media buffer, etc., the media measurement system can be configured to process media data units in the media data (202) either in the same order as or in a different order from the order in which these media data units are received.

In block 302, for the purpose of illustration only, the media measurement system (200) derives a query fingerprint from a media data unit in the sequence of media data units in the media data (202). In some embodiments, multiple query fingerprints may be derived from the same media data unit instead of only one query fingerprint. The media measurement system (200) sends a fingerprint identification query with the derived query fingerprint to a media fingerprint archive system (e.g., 100 of FIG. 1, etc.), in order to determine whether the query fingerprint matches any archived fingerprint for a secondary media content portion in the media fingerprint archive system (100).

In block 304, the media measurement system (200) receives a fingerprint identification response to the fingerprint identification query, for example, sent by the media fingerprint archive system (100).

In block 306, the media measurement system (200) determines whether the fingerprint identification response is a positive one indicating a match found between the query fingerprint and an archived fingerprint, or a negative one indicating no such match.

In response to receiving a positive fingerprint identification response, the process flow goes to block 308, in which the media measurement system (200) further determines whether the media data unit from which the query fingerprint was derived represents a new secondary media content portion in the media data (202). The media data unit may represent a part of media sample data for a new secondary media content portion, which is preceded by either a primary media content portion or a different secondary media content portion. Alternatively, the media data unit may represent a part of media sample data for an existing secondary media content portion for which an existing set of media measurements is being performed.

In some embodiments, a positive fingerprint identification response from the media fingerprint archive system (100) may comprise a unique identifier of a secondary media content portion from which the archived fingerprint matching the query fingerprint was derived and archived. The media measurement system (200) can keep track of unique identifiers received in positive fingerprint identification responses from the media fingerprint archive system (100) and determine, based at least in part on the unique identifier in the (current) positive fingerprint identification response, whether the media data unit from which the query fingerprint was derived is (a start of) a new secondary media content portion, or whether the media data unit is (a start of) a new secondary media content portion.

In some embodiments, the media measurement system (200) can analyze the media data unit in the media data (202) to identify media characteristics of the media data unit, and to determine whether the media data unit corresponds to a new secondary media content portion embedded within the media data (202) based on the identified media characteristics of the media data unit.

In response to determining that the media data unit is (a start of) a new secondary media content portion, the process flow goes to block 310, in which the media measurement system (200) starts a new set of media measurements for the new secondary media content portion.

On the other hand, in response to determining that the media data unit is not (a start of) a new secondary media content portion but rather an existing media content portion for which an existing set of media measurements has started, in block 312, the media measurement system (200) continues the existing set of media measurements for the existing media content portion. Subsequently, the processing flow from either block 310 or block 312 goes to block 314.

In response to receiving a negative fingerprint identification response, as determined in block 306, the process flow goes to block 316, in which the media measurement system (200) identifies media characteristics of the media data unit. Subsequently, in block 318, the media measurement system (200) determines, based at least in part on the media characteristics of the media data unit identified in block 316, whether the media data unit corresponds to a secondary media content portion embedded within the media data (202).

In response to determining that the media data unit corresponds to a secondary media content portion in block 318, the process flow goes to block 308, in which the media measurement system (200) further determines whether the media data unit represents a new secondary media content portion in the media data (202).

As previously noted, in some embodiments, the media measurement system (200) can analyze the media data unit in the media data (202) to identify media characteristics of the media data unit, and to determine whether the media data unit corresponds to a new secondary media content portion embedded within the media data (202) based on the identified media characteristics of the media data unit. In some embodiments, some or all of the characteristics identified in block 316, as appropriate if available, may be used in block 308 to determine whether the media data unit represents a new secondary media content portion in the media data (202).

In response to determining that the media data unit does not correspond to a secondary media content portion in block 318, the process flow goes to block 320. For example, the media data unit may correspond to a primary media content portion (e.g., not a commercial advertisement, etc.). In block 320, the media measurement system (200) performs no media measurements for the media data unit from which the query fingerprint was derived. Subsequently, the process flow goes to block 314.

In block 314, the media measurement system (200) determines whether the media data unit represents the last one in the media data (202). If so, the process flow ends. Otherwise, the process flow goes to block 302 to continue processing subsequent media data units in the media data (202).

6. Example Process Flow

FIG. 4A and FIG. 4B illustrate example process flows. In some embodiments, one or more computing devices or units may perform the process flows.

In block 402 of FIG. 4A, a media measurement system (e.g., 200 of FIG. 2, etc.) extracts a plurality of query fingerprints from media data that comprises one or more primary media content portions embedded with one or more secondary media content portions.

In block 404, the media measurement system (200) sends a plurality of fingerprint identification queries to a media fingerprint archive system. Each fingerprint identification query in the plurality of fingerprint identification queries comprises at least one query fingerprint in the plurality of query fingerprints.

In block 406, the media measurement system (200) receives a plurality of fingerprint identification responses from the media fingerprint archive system. Each fingerprint identification response in the plurality of fingerprint identification responses is responsive to a corresponding fingerprint query in the plurality of fingerprint identification queries, and indicates a positive fingerprint identification or a negative fingerprint identification.

In block 408, the media measurement system (200), in response to receiving at least one positive fingerprint identification response in the plurality of fingerprint identification responses from the media fingerprint archive system: identifies a first secondary media content portion of the one or more secondary media content portions embedding within the one or more primary media content portion; and performs a first set of media measurements on the first secondary media content portion of the one or more secondary media content portions embedding within the one or more primary media content portion.

In an embodiment, the media measurement system (200) is further configured to, in response to receiving at least one negative fingerprint identification in the plurality of fingerprint identification responses from the media fingerprint archive system, determine whether a media data portion in the media data comprises one or more specific characteristics; and in response to determining that the media data portion in the media data comprises the one or more specific characteristics, (a) identifying the media data portion as a secondary media content portion of the one or more secondary media content portions embedding within the one or more primary media content portion and (b) performing a second set of media measurements on the secondary media content portion of the one or more secondary media content portions embedding within the one or more primary media content portion.

In an embodiment, the media measurement system (200) is further configured to control at least one media characteristic of the secondary media content portion in response to determining that the media data portion in the media data comprises the one or more specific characteristics. Under other approaches, "real-time" loudness control devices, for example those as used by broadcasters, cannot make a distinction between commercials and the accompanying programs and generally use the same configuration (e.g. aggressiveness, operational parameters) for both commercials and the accompanying programs. In contrast, under techniques as described herein, real-time loudness controllers can be configured to use the fingerprinting system to distinguish between commercials and programs in real-time or near-real-time, then: (a) re-configure themselves differently for each content type (e.g. use aggressive loudness control on commercials, light loudness control on programs, etc.); and/or (b) switch off loudness control altogether on the accompanying programs, while still correcting commercials.

In an embodiment, the at least one media characteristic as mentioned above comprises loudness.

In an embodiment, the one or more specific characteristics comprise at least one of: time of day, duration, frequency of scene changes, facial recognition, figure/form recognition, presence of speech, presence of music, identification of audio transients, visual spectral content, audio spectral content, video effects, ticklers, pre-existing secondary program identifiers, network watermarks, rating watermarks, captioned/embedded texts, applause, program and scene transition, loudness, etc.

In an embodiment, the media measurement system (200) is further configured to send the one or more specific characteristics identified from the secondary media content portion and one or more fingerprints derived from the secondary media content portion to a media fingerprint archive for storage.

In an embodiment, the plurality of media fingerprints comprises one or more of (a) video fingerprints each of which is derived from images or frames, comprises a low bit rate representation of video content from which it is derived and uniquely corresponds to the video content and is computed from characteristic components of the video content to which the video fingerprint corresponds or (b) audio fingerprints each of which is generated from a particular audio waveform as code that uniquely corresponds to the particular audio waveform.

In an embodiment, the media data comprises one or more of: audio content only, video content only, or both audio content and video content.

In an embodiment, the media data is received in one of an over-the-air broadcast signal, a cable broadcast signal, a satellite broadcast signal, a media data bitstream, or a media data file.

In block 452 of FIG. 4B, a media fingerprint archive system (e.g., 100 of FIG. 1, etc.) maintains a media fingerprint archive for secondary media content portions that are to embed with primary media content portions.

In block 454, the media fingerprint archive system (100) receives, from a client, a fingerprint identification query with a query fingerprint derived from media data comprising both primary and secondary media content portions.

In block 456, the media fingerprint archive system (100), in response to receiving the fingerprint identification query with the query fingerprint, determines whether the query fingerprint matches with any fingerprint archived in the media fingerprint archive.

In block 458, the media fingerprint archive system (100), in response to determining that the query fingerprint matches with a fingerprint archived in the media fingerprint archive, returns a positive fingerprint identification response to the fingerprint identification query, wherein the fingerprint archived in the media fingerprint archive is derived from a corresponding secondary media content portion.

In an embodiment, the media fingerprint archive system (100) is further configured to, in response to determining that the query fingerprint does not match with any fingerprint archived in the media fingerprint archive, return a negative fingerprint identification response to the fingerprint identification query.

In an embodiment, the media fingerprint archive system (100) is further configured to receive a media fingerprint storing request with one or more media fingerprints generated for a secondary media content portion whose fingerprints has not previously been archived; and store the media fingerprints into the media fingerprint archive.

In embodiments, a media processing system configured to perform any one of the methods as described herein.

In embodiments, an apparatus comprising a processor and configured to perform any one of the methods as described herein.

In embodiments, a non-transitory computer readable storage medium, comprising software instructions, which when executed by one or more processors cause performance of any one of the methods as described herein.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
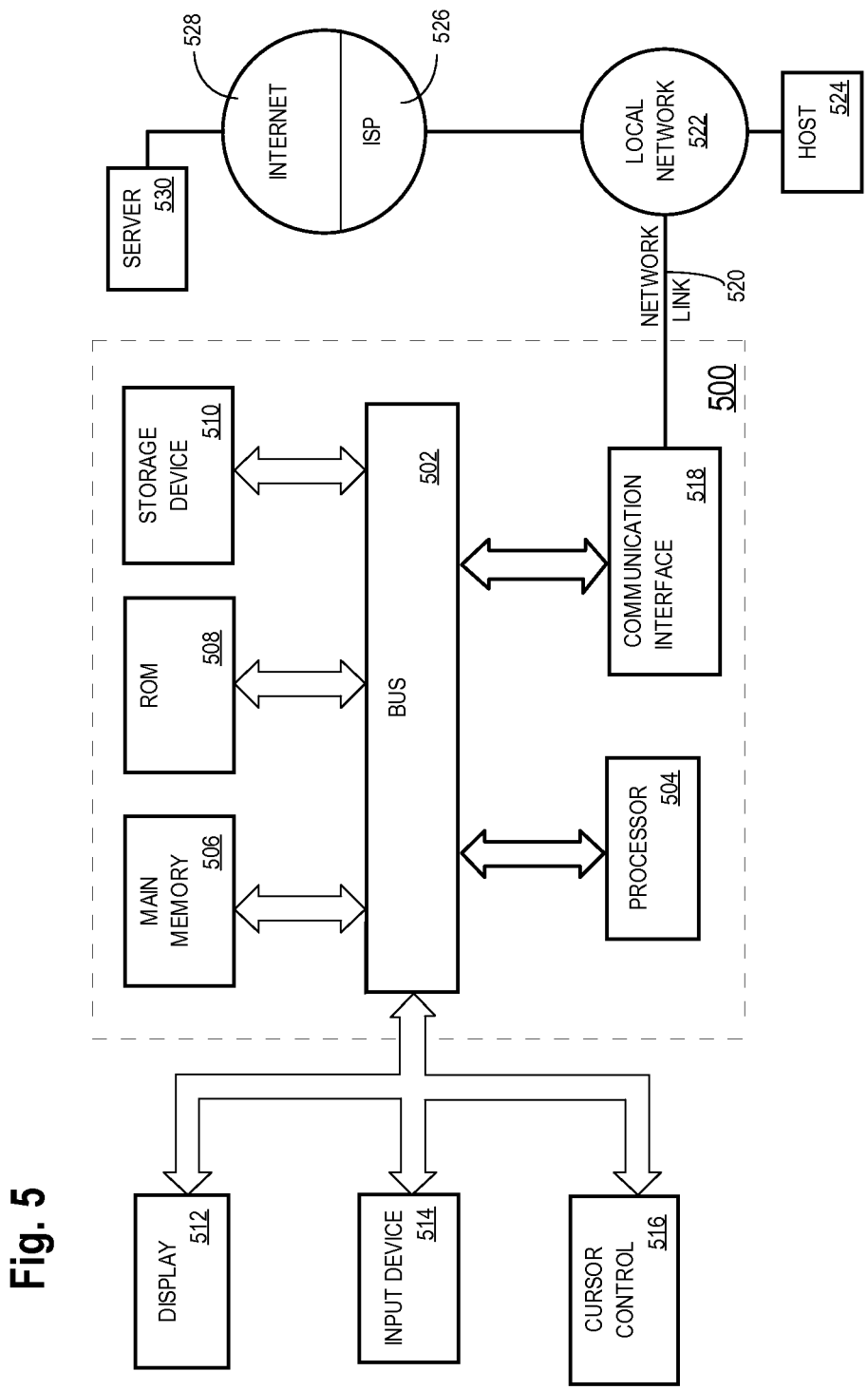
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   extracting a plurality of query fingerprints from media data that comprises one or more primary media content portions embedded with one or more secondary media content portions;
   wherein the media data is received in one of an over-the-air broadcast signal, a cable broadcast signal, a satellite broadcast signal, a media data bitstream, or a media data file;
   sending a plurality of fingerprint identification queries to a media fingerprint archive system, each fingerprint identification query in the plurality of fingerprint identification queries comprising at least one query fingerprint in the plurality of query fingerprints;
   receiving a plurality of fingerprint identification responses from the media fingerprint archive system, each fingerprint identification response in the plurality of fingerprint identification responses being responsive to a corresponding fingerprint query in the plurality of fingerprint identification queries, and each fingerprint identification response in the plurality of fingerprint identification responses indicating a positive fingerprint identification or a negative fingerprint identification;
   in response to receiving at least one positive fingerprint identification response in the plurality of fingerprint identification responses from the media fingerprint archive system:
      identifying a first secondary media content portion of the one or more secondary media content portions embedded within the one or more primary media content portions;
      performing a first set of media measurements on the first secondary media content portion of the one or more secondary media content portions embedded within the one or more primary media content portions;
      controlling at least one media characteristic of the first secondary media content portion in response to receiving the at least one positive fingerprint identification in the plurality of fingerprint identification responses from the media fingerprint archive system;
      wherein the at least one media characteristic comprises loudness;
   wherein the method is performed by one or more computing devices.

2. The method as recited in claim 1, further comprising:
   in response to receiving at least one negative fingerprint identification in the plurality of fingerprint identification responses from the media fingerprint archive system, performing:
      determining whether a media data portion in the media data comprises one or more specific characteristics;
      in response to determining that the media data portion in the media data comprises the one or more specific characteristics, performing:
         identifying the media data portion as a secondary media content portion of the one or more secondary media content portions embedding within the one or more primary media content portion;
         performing a second set of media measurements on the secondary media content portion of the one or more secondary media content portions embedding within the one or more primary media content portion.

3. The method as recited in claim 2, further comprising controlling at least one media characteristic of the secondary media content portion in response to determining that the media data portion in the media data comprises the one or more specific characteristics.

4. The method as recited in claim 3, wherein the at least one media characteristic comprises loudness.

5. The method as recited in claim 2, wherein the one or more specific characteristics comprise at least one of: time of day, duration, frequency of scene changes, facial recognition, figure/form recognition, presence of speech, presence of music, identification of audio transients, visual spectral content, audio spectral content, video effects, pre-existing secondary program identifiers, network watermarks, rating watermarks, captioned/embedded texts, applause, program and scene transition, or loudness.

6. The method as recited in claim 2, further comprising sending the one or more specific characteristics identified from the secondary media content portion and one or more fingerprints derived from the secondary media content portion to a media fingerprint archive system for storage.

7. The method as recited in claim 1, wherein the plurality of media fingerprints comprises one or more of (a) video fingerprints each of which is derived from images or frames, comprises a low bit rate representation of video content from which it is derived and uniquely corresponds to the video content and is computed from characteristic components of the video content to which the video fingerprint corresponds or (b) audio fingerprints each of which is generated from a particular audio waveform as code that uniquely corresponds to the particular audio waveform.

8. The method as recited in claim 1, wherein the media data comprises one or more of: audio content only, video content only, or both audio content and video content.

9. A non-transitory computer readable storage medium, comprising software instructions, which when executed by one or more processors cause the one or more processors to perform:
   extracting a plurality of query fingerprints from media data that comprises one or more primary media content portions embedded with one or more secondary media content portions;
   wherein the media data is received in one of an over-the-air broadcast signal, a cable broadcast signal, a satellite broadcast signal, a media data bitstream, or a media data file;
   sending a plurality of fingerprint identification queries to a media fingerprint archive system, each fingerprint identification query in the plurality of fingerprint identification queries comprising at least one query fingerprint in the plurality of query fingerprints;
   receiving a plurality of fingerprint identification responses from the media fingerprint archive system, each fingerprint identification response in the plurality of fingerprint identification responses being responsive to a corresponding fingerprint query in the plurality of fingerprint identification queries, and each fingerprint identification response in the plurality of fingerprint identification responses indicating a positive fingerprint identification or a negative fingerprint identification;
   in response to receiving at least one positive fingerprint identification response in the plurality of fingerprint identification responses from the media fingerprint archive system:
      identifying a first secondary media content portion of the one or more secondary media content portions embedded within the one or more primary media content portions;
      performing a first set of media measurements on the first secondary media content portion of the one or more secondary media content portions embedded within the one or more primary media content portions;
      controlling at least one media characteristic of the first secondary media content portion in response to receiving the at least one positive fingerprint identification in the plurality of fingerprint identification responses from the media fingerprint archive system;
      wherein the at least one media characteristic comprises loudness.

10. The medium as recited in claim 9, wherein the software instructions, which when executed by the one or more processors further cause the one or more processors to perform:
   in response to receiving at least one negative fingerprint identification in the plurality of fingerprint identification responses from the media fingerprint archive system, performing:
      determining whether a media data portion in the media data comprises one or more specific characteristics;
      in response to determining that the media data portion in the media data comprises the one or more specific characteristics, performing:
         identifying the media data portion as a secondary media content portion of the one or more secondary media content portions embedding within the one or more primary media content portion;
         performing a second set of media measurements on the secondary media content portion of the one or more secondary media content portions embedding within the one or more primary media content portion.

11. The medium as recited in claim 9, wherein the plurality of media fingerprints comprises one or more of (a) video fingerprints each of which is derived from images or frames, comprises a low bit rate representation of video content from which it is derived and uniquely corresponds to the video content and is computed from characteristic components of the video content to which the video fingerprint corresponds or (b) audio fingerprints each of which is generated from a particular audio waveform as code that uniquely corresponds to the particular audio waveform.

12. The medium as recited in claim 9, wherein the media data comprises one or more of: audio content only, video content only, or both audio content and video content.

13. An apparatus comprising:
   one or more processors;
   a non-transitory computer readable storage medium, comprising software instructions, which when executed by the one or more processors cause the one or more processors to perform:
      extracting a plurality of query fingerprints from media data that comprises one or more primary media content portions embedded with one or more secondary media content portions;
      wherein the media data is received in one of an over-the-air broadcast signal, a cable broadcast signal, a satellite broadcast signal, a media data bitstream, or a media data file;
      sending a plurality of fingerprint identification queries to a media fingerprint archive system, each fingerprint identification query in the plurality of fingerprint identification queries comprising at least one query fingerprint in the plurality of query fingerprints;

receiving a plurality of fingerprint identification responses from the media fingerprint archive system, each fingerprint identification response in the plurality of fingerprint identification responses being responsive to a corresponding fingerprint query in the plurality of fingerprint identification queries, and each fingerprint identification response in the plurality of fingerprint identification responses indicating a positive fingerprint identification or a negative fingerprint identification;

in response to receiving at least one positive fingerprint identification response in the plurality of fingerprint identification responses from the media fingerprint archive system:

identifying a first secondary media content portion of the one or more secondary media content portions embedded within the one or more primary media content portions;

performing a first set of media measurements on the first secondary media content portion of the one or more secondary media content portions embedded within the one or more primary media content portions;

controlling at least one media characteristic of the first secondary media content portion in response to receiving the at least one positive fingerprint identification in the plurality of fingerprint identification responses from the media fingerprint archive system;

wherein the at least one media characteristic comprises loudness.

14. The apparatus as recited in claim 13, wherein the software instructions, which when executed by the one or more processors further cause the one or more processors to perform:

in response to receiving at least one negative fingerprint identification in the plurality of fingerprint identification responses from the media fingerprint archive system, performing:

determining whether a media data portion in the media data comprises one or more specific characteristics;

in response to determining that the media data portion in the media data comprises the one or more specific characteristics, performing:

identifying the media data portion as a secondary media content portion of the one or more secondary media content portions embedding within the one or more primary media content portion;

performing a second set of media measurements on the secondary media content portion of the one or more secondary media content portions embedding within the one or more primary media content portion.

15. The apparatus as recited in claim 13, wherein the plurality of media fingerprints comprises one or more of (a) video fingerprints each of which is derived from images or frames, comprises a low bit rate representation of video content from which it is derived and uniquely corresponds to the video content and is computed from characteristic components of the video content to which the video fingerprint corresponds or (b) audio fingerprints each of which is generated from a particular audio waveform as code that uniquely corresponds to the particular audio waveform.

16. The apparatus as recited in claim 13, wherein the media data comprises one or more of: audio content only, video content only, or both audio content and video content.

\* \* \* \* \*